Jan. 15, 1952 J. U. TEAGUE 2,582,893
JET-DRIVEN VARIABLE PITCH PROPELLER
Filed Feb. 10, 1947 2 SHEETS—SHEET 1
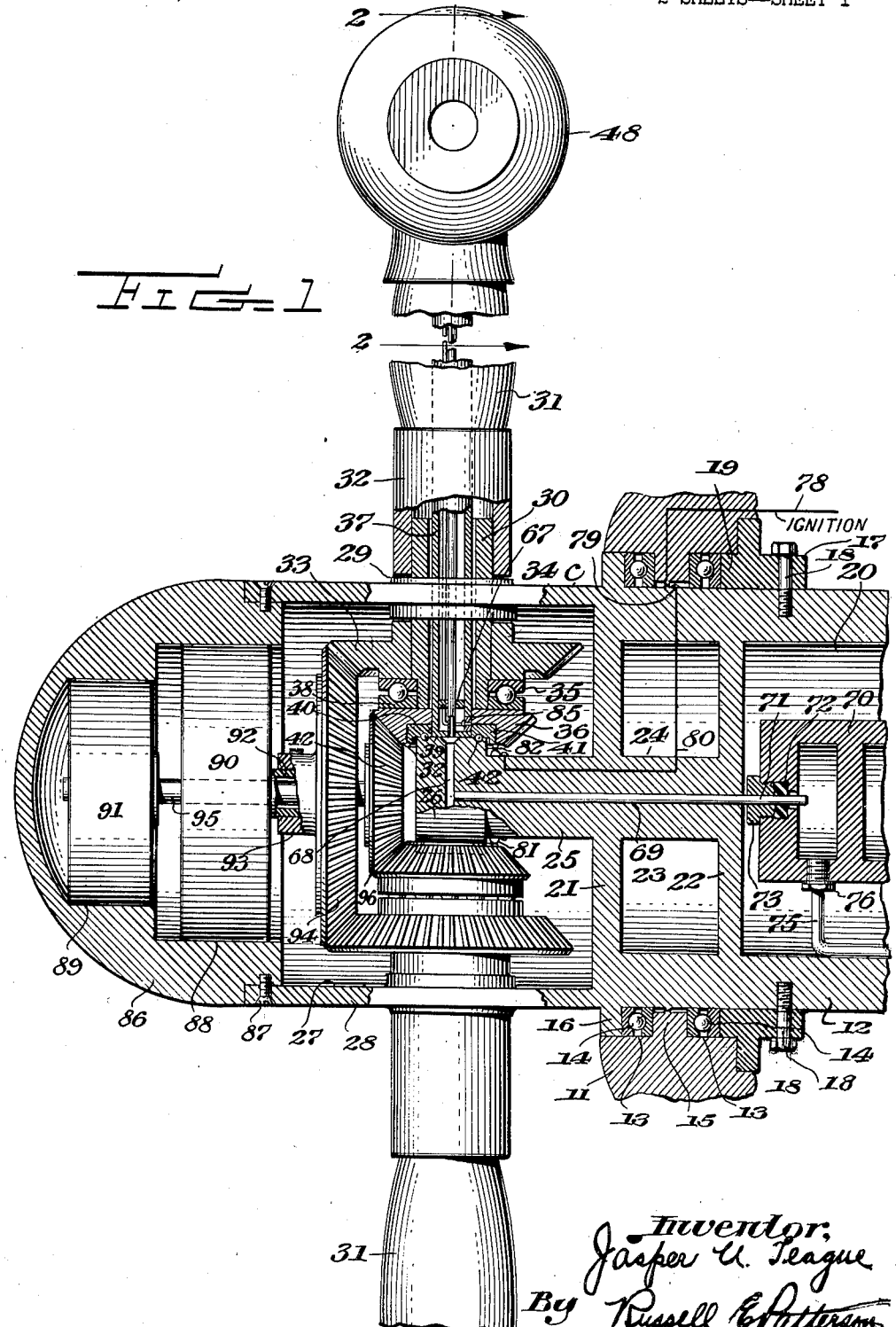
Inventor;
Jasper U. Teague
By Russell E. Patterson
atty.

Jan. 15, 1952     J. U. TEAGUE     2,582,893
JET-DRIVEN VARIABLE PITCH PROPELLER
Filed Feb. 10, 1947     2 SHEETS—SHEET 2
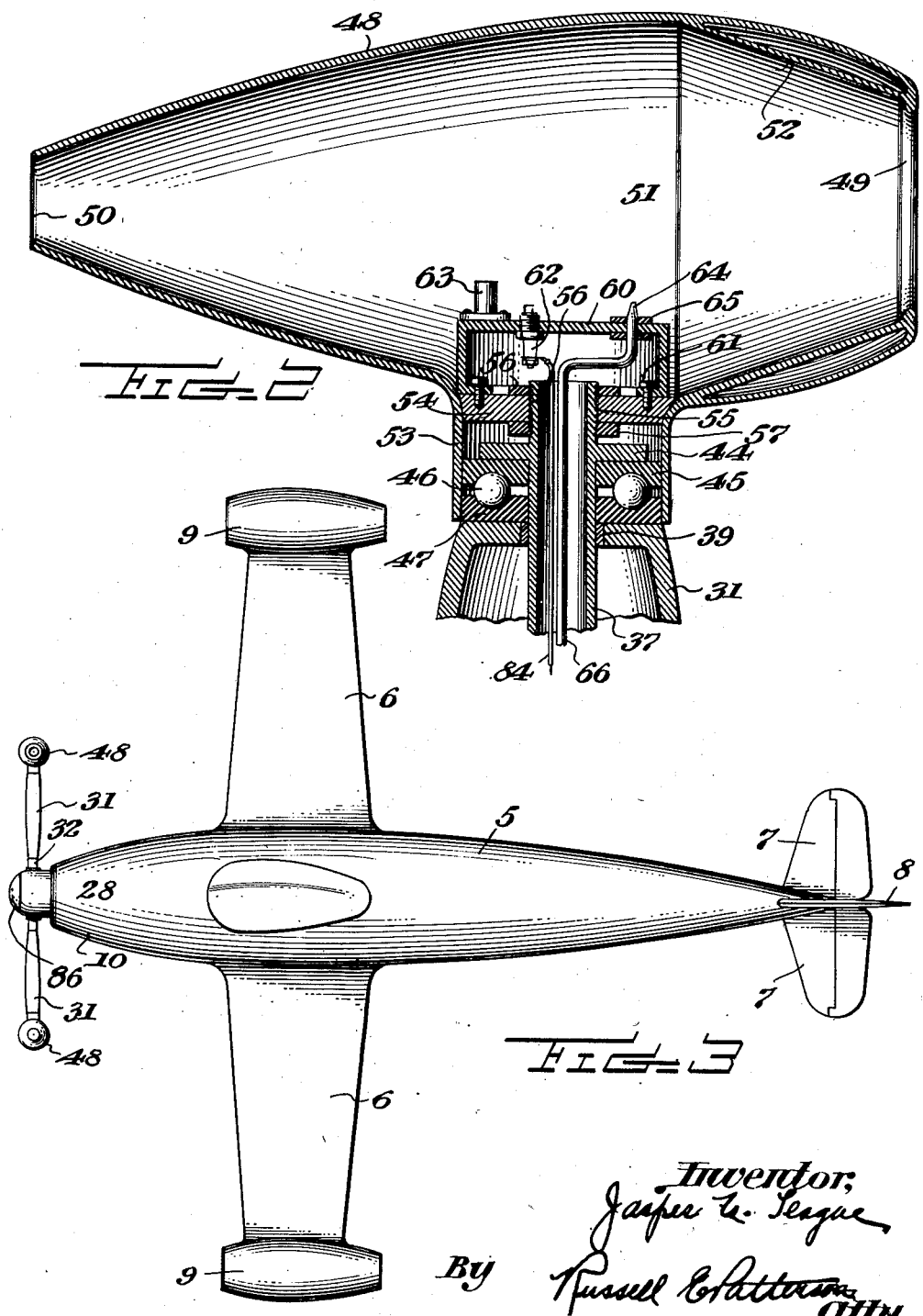

Patented Jan. 15, 1952

2,582,893

UNITED STATES PATENT OFFICE 2,582,893

JET-DRIVEN VARIABLE PITCH PROPELLER

Jasper U. Teague, Ferguson Park,
Newport News, Va.

Application February 10, 1947, Serial No. 727,713

2 Claims. (Cl. 170—135.4)

The present invention relates to improvements in aircraft, and more particularly to a propulsion system therefor.

An object of the invention resides in the provision of an aircraft either of the heavier-than-air type or of the lighter-than-air type with a light-weight, economical, safe and reliable power plant in the form of athodyd or reaction motor powered air screws as the sole means of propulsive power. This includes helicopters as well as light airplanes and lighter-than-air craft.

Another object of the invention, is to provide an aircraft with a fluid propulsion system in which the screw propeller is provided with athodyds or reaction motors at the tips thereof, arranged in opposed relation transverse to the axis of the aircraft to provide non-concurrent or opposite forces for imparting rotation to the propeller at a high rate of rotational speed.

Another object of the invention is to provide a fluid propulsion system of the above mentioned character in which the propeller blades can be angularly adjusted during initial starting of the athodyd or reaction motors at the tips thereof to thus reduce the load and facilitating rotational speeds sufficient to build up high pressures in the athodyd or reaction motors and enable combustion to take place therein.

Another object of the invention resides in providing a propulsion system for aircraft of the above mentioned type in which the athodyd or reaction motors positioned at the extremities of the propeller blades can be angularly displaced to assume a position parallel with the axis of the aircraft after the aircraft has attained sufficient speed for initiating starting of the ram jets, athodyds or reaction motors carried by the aircraft. Thus, the athodyds or reaction motors on the propeller tips will operate in conjunction with the fixed conventional athodyds or reaction motors installed as fixed structural parts of the aircraft to thereby materially increase the speed of the plane.

Another object of the invention resides in the provision of control means for feathering or adjusting the propeller blades operable from a position adjacent the pilot's seat, whereby the pilot can adjust the angular pitch of the blades during take-offs and/or in full flight.

Another object of the invention resides in the provision of control means located within easy reach of the pilot for angularly displacing the athodyds or reaction motors within angular limits of 90° so that the athodyds or reaction motors can be controlled from the pilot's seat to permit angular displacement from a position in which the athodyds or reaction motors are transverse to the axis of the aircraft to one in which the jets or reaction motors are parallel with said plane axis.

Other objects and advantages of the invention will become apparent during the course of the following description of the accompanying drawings, wherein:

Figure 1 is a longitudinal cross sectional view through the hub of a propeller embodying the invention and showing various details of construction, as well as the arrangement of the gearing for feathering and adjusting the propeller blades as well as the gearing for angularly displacing the athodyds or reaction motors within 90° limits to assist in ascending and descending, Figure 2 is a vertical cross sectional view taken on line 2—2 of Figure 1 and looking in the direction of the arrows, further illustrating various details of construction and showing the manner in which the athodyds or reaction motors are rotatably mounted at the free ends of the screw propeller, and, Figure 3 is a top plan view of an aircraft showing the general arrangement of the athodyds or reaction motors on the wing tips of the aircraft and also on the propeller tips thereof.

*Brief description of the invention*

The invention consists in providing ram-jet reaction motors of the combustible fuel type or so-called athodyds for the tips of an adjustable pitch propeller. The athodyds being of the conventional reaction motor type wherein a nacelle shaped tubular casing is provided with differential openings at the front and rear thereof such as to create an internal high pressure area. The theory being that the nacelle shaped casing being moved rapidly throuh space, causes air to pass through a restricted opening at a high velocity so that upon movement of the air into the nacelle casing, where area is less restricted, the velocity is reduced thus creating a higher pressure than the external air pressure. A suitable fuel is fed to the air of increased pressure and is ignited when brought into contact with a suitable igniter plug. Hence, the gases of combustion pass out of the rearward opening and exert a rearward action force, thus producing a forward reaction force which is imparted to the casing.

By mounting the reaction motors or so-called athodyds on the tips of an adjustable pitch propeller so that the nacelle shaped casing can be angularly displaced various angular distances with respect to the transverse axis of the propeller, the reaction force will cause the propeller to be rotated when the nacelle shaped casings are positioned in opposed relation so that the action force of each is non-concurrent. Also, the nacelle shaped casing on the end of each propeller blade can be angularly displaced (after the aircraft has attained sufficient speed and power from the fixed athodyds) to assume a position in which the action force is directed rearwardly parallel with the longitudinal axis of the aircraft. In this position, the athodyds on the tips of the propeller cooperate with the fixed athodyds or reaction motors on the plane to increase the speed thereof.

It is intended that the pitch of the propeller be substantially neutral during starting of the reaction motors or athodyds to reduce the load thereon and facilitate easy starting of the athodyds by an extraneous power source, such as an electric motor or the like. After the athodyds have reached a predetermined temperature and speed, starting will be effected for self propulsion and the extraneous power source can then be eliminated and the take-off of the plane effected by regulating the pitch of the propeller. Fuel may be regulated either automatically or manually as later experience determines.

Detailed description of the drawings

In the drawings, attention is first directed to Figure 3 wherein there is shown an aircraft, including a fuselage 5, having wings 6 provided along their rear edge with the usual ailerons (not shown), tail elevators 7 and a rudder 8. Reaction motors or athodyds 9 are affixed to the wing tips 6 in a conventional manner. The athodyds 9 are composed of a streamlined nacelle having differential openings to create a high internal pressure zone to which is admitted fuel for ignition to produce a continuous action blast directed rearwardly so that the reaction force will produce forward movement of the plane. The forward end of the fuselage tapers to a nose portion 10 in a conventional manner.

The invention comprises a built up annular frame structure 11 on the nose portion 10 which is adapted to provide a bearing housing for a rotatable propeller shaft 12. The annular bearing member 11 is provided with anti-friction thrust bearing seats 13 for receiving ball bearing assemblies 14 arranged one on each side of the annular flange 15 formed by the annular bearing seats 13. Formed integral with the propeller shaft 12 is an annular flange 16 which is adapted to abut one of the ball bearing assemblies and a retainer ring 17 is bolted to the propeller shaft 12 by means of machine screws 18 (Figure 1). An inwardly extending projecting 19 is formed on the retaining ring 17 which has one face in abutting relationship with the other of said bearing assemblies. From an inspection of Figure 1, it will be seen that the propeller shaft projects forwardly from the nose of the fuselage and that a portion extends into said nose so that a starting motor may be drivingly connected with the inner end of said shaft (not shown) to initiate starting of the athodyds or reaction motors. For this purpose, an electric motor may be provided or, if desired, a small internal combustion engine may be mounted in the nose of the fuselage and drivingly connected with the propeller shaft by means of suitable gearing, or small rocket units on the propeller tip may be used.

The propeller shaft is tubular throughout the major portion of its length to provide a rear chamber 20, the forward end of which is separated by means of a pair of transverse support spiders or brackets 21 and 22 spaced apart to form a support for a central boss 24 which continues forwardly beyond the support 21 to provide a central projection or boss 25 terminating in an enlarged head portion 26. The extreme forward end of the propeller shaft 12 is formed with an enlarged bore 27 to provide a cylindrical propeller hub 28 (Figure 1), having diametrically disposed bearing bosses 29 for rotatably supporting a pair of diametrically aligned relatively short tubular shafts 30. Tubular propeller blades 31 have their inner ends secured to the short tubular shaft 30 by means of a retaining collar 32 which is fitted over the tubular shaft 30 and welded or otherwise connected to the inner end of the propeller blades.

Secured to the inner end of each of the tubular shafts 30 is a bevel gear 33, the hub 34 of which is keyed to the short tubular shaft in a manner such to prevent longitudinal movement of the short tubular shafts and propeller blades when the propeller is rotated at high speeds. Also, mounted on each of the inner ends of the short tubular shafts 30 is an anti-friction thrust bearing assembly 35 having one of the race members in abutting relation with the bevel gear 33 and the other race member arranged in engagement with a similar bevel gear 36 keyed to one end of a tubular shaft 37 which extends concentrically through the short tubular shaft 30 as well as the tubular propeller blades 31. The outer ends of the concentric tubular shafts 37 extend through bearing openings 39 in the closed outer ends of the tubular propellers 31. Hence, relative rotation between the tubular propeller blades 31 and the concentric tubular shaft 37 may be effected by simply imparting rotational movement to the inner ends of said short shafts 30 and concentric tubular shafts 37 through the medium of the respective bevel gears 33 and 36.

The innermost ends of the concentric tubular shafts 37 are closed by end wall portions 38 which abut diametrically opposed flat surfaces 39 on the enlarged head 26 of the central boss 25. Also, the bevel gear 36 is provided with an annular central recess 40 for receiving a bearing disk 41 which is sweated or otherwise retained in said recess. The bearing disk 41 and flattened surface 39 have their opposed faces provided with annular bearing recesses for mutually receiving a series of ball bearings 42 so that considerable resistance to turning movement of the concentric tubular shaft 37 will be overcome.

Formed integral with or welded to each of the tubular concentric shafts 37 a slight distance from the outer ends thereof is an annular flange 44 (Figure 2) which is adapted to form a seating surface for one of the race members 45 of an anti-friction thrust bearing assembly 46. The other race member 47 of said bearing assembly is in abutting relation with the closed end of the tubular propellers. Thus, free rotational movement between the propeller and concentric tubular shaft may be further facilitated.

Supported on the free end of each of the concentric tubular shafts 37 is a reaction motor 48 of the combustible fuel type, including a streamlined tubular housing having a restricted opening 49 and a nozzle 50 at the forward and rear ends thereof respectively. The opening 49 being slightly smaller in diameter than the combustion chamber to provide an intermediate high pressure zone 51 within the reaction motor housing when the housing is moved through space at high angular velocity. Extending from the edge of the opening 49 to a point a slight distance rearwardly therefrom is a frusto-conical sleeve 52 which gradually increases in diameter from the opening 49 to said point slightly rearward thereof. Said frusto-conical sleeve provides a straight wall surface for reducing the velocity of the air entering the opening 49 and thus creating the high pressure zone immediately rearward of said sleeve. As the air passes rearwardly through the nozzle 50 a high velocity low pressure zone is thus formed immediately rearward of the streamlined reaction motor housing.

Formed integral with each of the reaction motor housings 48 is a tubular projection 53 which encircles and houses the bearing assembly 46. Mounted within the tubular projection of each reaction motor housing is a disk-like plate 54 which has its marginal edge welded or otherwise secured within the tubular extension to prevent displacement thereof, and said plate-like member is provided with a central threaded and keyslotted opening 55 for being received on a correspondingly threaded and key-slotted portion 56 of the tubular concentric shaft 37. Retaining nuts 57 and 58 are also received on the threaded end portions 56 of the concentric tubular shafts 37 and are arranged one on each side of the disklike plate member 54. It will thus be seen, that the reaction motor or athodyd 48 is rigidly affixed to the free end of each concentric tubular shaft in such a manner as to be angularly displaced a predetermined distance upon movement of the concentric tubular shaft about its axis a corresponding angular distance.

Mounted within each of the athodyd type reaction motor housings 48 is an open-sided boxstructure 60 which is affixed to the disk-like plate member 54 thereof by machine screws 61. The concentric tubular shaft 37 has its open end in communication with the interior of said box-like structure to accommodate the passage of fuel and ignition lines which will be hereinafter more fully described. A spark plug opening is formed in one wall of the box-like housing 60 for receiving a spark plug 62 of conventional design and said spark plug is positioned with its electrodes projecting into the high pressure zone of the athodyd or reaction motor housing. Mounted adjacent the spark plug of each athodyd or reaction motor and likewise supported on one wall of the box-like structure 60 is a firing plug 63 formed of a metal having a low melting point such that a state of incandenscence will be reached under the temperatures created upon firing of the explosive gases in the athodyd or reaction motor housing 48.

Also mounted in one wall of the box-like structure 60 of each athodyd or reaction motor 48 is a fuel supply nozzle 64 which projects into the high pressure area of said housing and is arranged a slight distance forwardly of the spark plug 62 and firing plug 63. Retaining washers 65 are threaded or otherwise secured to the fuel nozzle jet 64 and are arranged one on each side of one of the walls of said box-like structure. A fuel supply line 66 is connected with the fuel jet 64 and extends through the tubular concentric shaft 37 with its open inner end extending through a central opening in the closure plug 38 of said concentric tubular shaft. A series of spacing disks 67 are arranged on the fuel line 66 for maintaining said supply line in position and to prevent vibration thereof during high propeller speeds.

The inner open end of each of said fuel supply lines 66 is positioned in registry with a transverse bore 68 formed in the enlarged head 26 of the central boss 25, and said transverse bore is supplied with fuel for simultaneous fuel feeding to the reaction motors through a longitudinal bore 69 extending through the central bosses 24—25 to a fuel metering housing 70. A short pipe section 71 has one end extending into the bore 69 to a point adjacent the transverse bore 68 while the opposite end extends into the metering chamber 70 through a suitable opening therein and is sealed by means of a packing ring 72 held in place and under compression by a gland unit 73.

Fuel under pressure and under throttle control is supplied to the metering chamber 70 by a fuel supply line 75 which has one end connected through a throttle valve (not shown) to a source of fuel supply (also not shown) and the other end connected to the metering chamber by means of a threaded connecting nipple 76.

Similarly, electrical energy is supplied to the spark plug 62 from a suitable high tension source such as an ignition coil and storage battery by means of an insulated conductor 78, which is electrically connected to one of the terminals of the high tension coil (the other terminal being grounded to the frame of the aircraft) and has its other end connected to a brush or the like engaging a collector ring 79 carried by and insulated from the propeller shaft 12. An insulated lead wire 80 is connected to the collector ring 79 and extends through the central bosses 24—25 where it is electrically connected to a collector ring 81 spaced a short distance from the enlarged head 26 of said boss 25 and suitably insulated therefrom. The wear plate 41 also carries a collector ring 82 which has electrical contact with said collector ring 81, and said collector ring is insulated from the wear plate by suitable insulation (not shown). An insulated electrical conductor 84 has one end electrically connected to the ungrounded electride of the spark plug 62 while its other end extends through the concentric tubular shaft 37 and is electrically connected to the collector ring 82. At the point where the electrical conductor passes through the concentric tubular shaft 37 and through the wear plate 41, suitable insulating bushings 85 may be employed for preventing short circuiting of the system.

While only one propeller blade and athodyd are shown in detail, it will be appreciated that a description of one will suffice for all since each of the propeller blades and the athodyds or reaction motors are identical in construction.

The open end of the propeller hub 28 is closed by a hub cap 86 which is fastened in place by machine screws 87, and said hub cap is provided with central bores 88 and 89 for receiving combined electric motor and reduction gear units 90 and 91 respectively. The power take-off shaft 92 of the motor and reduction gear unit 90 is formed tubular and has affixed to the end thereof the hub 93, of a bevel gear 94. Similarly, the power take-off shaft 95 of the motor and reduction gear unit 91 extends through the tubular power take-off shaft 92 and is connected to a bevel gear 96. The bevel gears 94 and 96 are presented for meshing engagement with the bevel gears 33 and 36 respectively and are adapted to drivingly connect the combined motors and reduction gear units to the tubular propeller 31 and concentric tubular shaft respectively.

Suitable electric control cables (not shown) can be provided for the respective motor and reduction gear units to energize the motors of said units and thereby control the angular position of the variable pitch propeller blades as well as the position of the respective athodyds or reaction motor units.

*Description of the operation of the invention*

In operation, it will first be assumed that the aircraft is at rest and preparation is being made for ascension or a so-called take-off. In starting, the athodyds or reaction motors are adjusted coplanar with the propeller blades. To initiate operation of the athodyds or reaction type motors 48, it is necessary that such athodyds or reaction motors be moved through space at a high velocity in order that the internal pressure will be slightly higher than the pressure wall in front of the athodyd or reaction motor. In order to rotate the propeller and the athodyds or reaction motors to build up their pressure wall, the pitch of the propeller blades is adjusted so that the same does not offer a load and an extraneous power source is employed to rotate the propeller shaft 12 at a speed such that the propeller tip speed will approach 440 feet per second. After the propeler has been rotated by the starting device to a speed as above, fuel is supplied to the athodyd or reaction motors 48 and said fuel mingles with a portion of the air within the athodyd or reaction motor to form a combustible mixture. Next, electrical energy is continuously supplied to the spark plug 62 to cause the ignition of the fuel mixture within the anthodyd or reaction motor and by reason of the difference in pressures at the front and rear of said athodyd or reaction motor housing 48, the expanding action is directed rearwardly such that the force of said expansion produces a forward reaction and imparts rotational movement to the propeller blades 31 about the axis of the shaft 12.

When the reaction motor of each propeller blade has operated for a predetermined time period, sufficient to raise the temperature of the firing plug 63 to a glow point, the ignition system is turned off so that the incoming fuel will be ignited by contact with the firing plug. After the athodyds or reaction motors become self igniting, the pitch of the propeller blades 31 can be adjusted by electrical energization of the combined electric motor and speed reduction unit 90. When the pitch of the propeller is thus changed from a neutral position to an angular position, the aircraft will be propelled forwardly. By gradually increasing the pitch of the propeller blades 31, a smooth and safe "take-off" can be effected.

It will be noted that the aircraft is thus solely propelled by the reaction motors or athodyds on the propeller tips and that after the aircraft has attained a sufficient speed in flight the fixed athodyds or reaction motors 9 may be started by reason of the pressure wall built up in front of said athodyds or reaction motors 9. When the athodyds or reaction motors 9 have been started sufficiently to sustain flight, the athodyds or reaction motors 48 can be angularly displaced from their coplanar position 90° so that the axis thereof will be parallel with the axis of the aircraft. Also, the propeller blades 31 can then be adjusted so that their planes are coincident and in the same plane with the longitudinal axis of the aircraft. In the latter position, the propeller blades offer very little wind resistance and help to maintain the plane in a straight line flight. Also, it is to be noted that when said athodyds or reaction motors are adjusted to extend in a direction in which their axes are parallel with one another and with the longitudinal axis of the aircraft, that they operate in conjunction with the athodyds or reaction motors 9 to materially increase the speed of the plane. The use of a propeller brake and locking device (not shown) is necessary to stop rotation of the propeller so that hot gases do not impinge on structural parts of the aircraft.

It is to be understood that the athodyds or reaction motors 9 function and operate in substantially the same manner as pointed out and described in connection with the athodyds or reaction motors 48.

It is further to be understood that various forms of fuel may be used for producing the high temperatures in the athodyds, such as combustible fuel, or any other type capable of producing high temperatures within the range of efficient operation.

It is to be further understood that the form of the invention herewith shown and described is to be taken as a preferred embodiment thereof and that various changes in the shape, size and arrangement of parts may be resorted to without departing from the spirit of the invention or the scope of the subjoined claims.

What I claim is:

1. In combination, an aircraft having a propeller shaft, a hollow hub mounted on said shaft, variable pitch propeller blades rotatably mounted on said hub about the longitudinal axis of said blades, ram jet reaction motor units rotatably mounted on the ends of said blades for angular displacement about an axis perpendicular to the longitudinal axis of the reaction motor units, a pair of control motors mounted in the hub with the motor shafts thereof coaxial with the propeller shaft, means drivingly connecting one of said motor shafts to the propeller blades to rotate the same in different directions of adjustment, and means drivingly connecting the other of said motor shafts to the ram jet reaction motor units to turn said units in opposite directions independently of the propeller blades.

2. In combination, an aircraft having a propeller shaft, a hollow propeller hub mounted on said shaft, propeller blades mounted on said hub for rotation about their longitudinal axis, shafts extending through said blades and projecting into said hub, reaction jet motor units on the ends of said shafts, reverse gearing connecting said propeller blades to adjust said blades to different pitch angles, reverse gearing connecting said shafts to turn said jet units in opposite directions independently of said propeller blades, a pair of control motors mounted in said hollow hub with their motor shafts extending coaxial, the motor shaft of one of said control motors being drivingly connected to the reverse gearing for said adjustable pitch propeller blades, and the motor shaft of said other control motor being drivingly connected to the reverse gearing for controlling said reaction jet motor units.

JASPER U. TEAGUE.

(References on following page)

REFERENCES CITED

The following references are of record in the file of this patent:

UNITED STATES PATENTS

| Number | Name | Date |
|---|---|---|
| 1,844,786 | Nelson | Feb. 9, 1932 |
| 1,888,749 | Urquhart | Nov. 22, 1932 |
| 2,001,529 | Dornier | May 14, 1935 |
| 2,054,610 | Volpicelli | Sept. 15, 1936 |
| 2,142,601 | Bleecker | Jan. 3, 1939 |
| 2,377,247 | Lagelbauer | May 29, 1945 |
| 2,397,357 | Kundig | Mar. 26, 1946 |
| 2,433,107 | Forsyth | Dec. 23, 1947 |
| 2,438,151 | Davis | Mar. 23, 1948 |
| 2,446,266 | Cummings | Aug. 3, 1948 |
| 2,474,685 | McCollum | June 28, 1949 |

FOREIGN PATENTS

| Number | Country | Date |
|---|---|---|
| 227,151 | Great Britain | Jan. 12, 1925 |
| 423,590 | France | Feb. 10, 1911 |
| 865,452 | France | Feb. 24, 1941 |